United States Patent
Kim et al.

(10) Patent No.: US 9,380,681 B2
(45) Date of Patent: Jun. 28, 2016

(54) LIGHTING SWITCH APPARATUS AND LIGHTING SWITCHING METHOD

(71) Applicant: ELECTRONICS AND TELECOMMUNICATIONS RESEARCH INSTITUTE, Daejeon (KR)

(72) Inventors: You-Jin Kim, Daejeon (KR); Dae-Ho Kim, Daejeon (KR); Hyun-Seok Kim, Daejeon (KR); Hyun-Jong Kim, Cheongju-si (KR); Tae-Gyu Kang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/598,775

(22) Filed: Jan. 16, 2015

(65) Prior Publication Data

US 2015/0208487 A1    Jul. 23, 2015

(30) Foreign Application Priority Data

Jan. 20, 2014 (KR) .................. 10-2014-0006847

(51) Int. Cl.
H05B 37/02    (2006.01)
(52) U.S. Cl.
CPC ...................... *H05B 37/0227* (2013.01)
(58) Field of Classification Search
None
See application file for complete search history.

(56) References Cited

U.S. PATENT DOCUMENTS

| | | | | |
|---|---|---|---|---|
| 4,563,029 | A * | 1/1986 | Luberacki | 294/99.1 |
| 5,600,323 | A * | 2/1997 | Boschini | 341/173 |
| 5,716,129 | A * | 2/1998 | Kunen et al. | 362/394 |
| 5,883,476 | A * | 3/1999 | Noguchi | G09G 1/00 |
| | | | | 315/368.12 |
| 8,054,159 | B2 | 11/2011 | Hyoung et al. | |
| 8,210,705 | B2 * | 7/2012 | Pesson et al. | 362/146 |
| 2006/0279896 | A1* | 12/2006 | Bruwer | 361/179 |
| 2008/0130417 | A1* | 6/2008 | Bhavnani | 368/11 |
| 2008/0290251 | A1 | 11/2008 | Deurenberg et al. | |
| 2009/0195659 | A1* | 8/2009 | Nagata et al. | 348/207.1 |
| 2010/0106044 | A1* | 4/2010 | Linderman | 600/546 |
| 2011/0204209 | A1* | 8/2011 | Barrows | 250/208.1 |
| 2011/0260629 | A1* | 10/2011 | Uedaira | G01J 1/02 |
| | | | | 315/158 |
| 2012/0172682 | A1* | 7/2012 | Linderman et al. | 600/301 |
| 2013/0003147 | A1* | 1/2013 | Shimatani | G03G 15/602 |
| | | | | 358/505 |

(Continued)

FOREIGN PATENT DOCUMENTS

KR    10-2008-0079269 A1    8/2008
KR    10-1265650 B1    5/2013

*Primary Examiner* — Crystal L Hammond
(74) *Attorney, Agent, or Firm* — Rabin & Berdo, P.C.

(57) ABSTRACT

Disclosed herein are a lighting switch apparatus and a lighting switching method, which can perform lighting control by blocking or passing light from a lighting device using a user's hand motion while the user may make input to a lighting switch by means of a capacitive touch on the lighting switch. The lighting switch apparatus includes a capacitive touch sensing unit for recognizing a user's touch. A hand motion visible light receiving unit receives visible light from a lighting device depending on motion of the user's hand. A control unit generates a touch-based lighting control signal based on results of touch recognition, controls the hand motion visible light receiving unit so that the user's hand motion-based signal is output based on the results of touch recognition, and generates a lighting control command by combining the lighting control signal with the user's hand motion-based signal.

12 Claims, 12 Drawing Sheets

(56) References Cited

U.S. PATENT DOCUMENTS

| | | | |
|---|---|---|---|
| 2013/0088868 A1* | 4/2013 | Slowinski et al. | 362/247 |
| 2013/0141009 A1 | 6/2013 | Jin et al. | |
| 2013/0293722 A1* | 11/2013 | Chen | 348/164 |
| 2014/0048724 A1* | 2/2014 | Marshall | 250/492.1 |
| 2014/0062297 A1* | 3/2014 | Bora | H05B 33/0863 315/34 |
| 2014/0149754 A1* | 5/2014 | Silva et al. | 713/300 |
| 2014/0253453 A1* | 9/2014 | Lo | 345/168 |
| 2015/0023019 A1* | 1/2015 | Chen | 362/276 |
| 2015/0049487 A1* | 2/2015 | Connor | 362/277 |

\* cited by examiner

LIGHTING SWITCH APPARATUS AND LIGHTING SWITCHING METHOD

CROSS REFERENCE TO RELATED APPLICATION

This application claims the benefit of Korean Patent Application No. 10-2014-0006847 filed Jan. 20, 2014, which is hereby incorporated by reference in its entirety into this application.

BACKGROUND OF THE INVENTION

1. Technical Field

The present invention relates generally to a lighting switch apparatus and lighting switching method and, more particularly, to a lighting switch apparatus and a lighting switching method, which simultaneously perform the sensing of a capacitive touch and the reception of visible light based on hand motion by using a lighting switch connected to a lighting control network.

2. Description of the Related Art

Conventional technology related to lighting is configured using technology for receiving the input of a lighting switch connected to lighting control networks, transferring received information to a lighting control unit through the lighting control networks, and allowing the lighting control unit to control (e.g., turning-on, turning-off or brightness control) lighting devices.

Lighting switches are implemented in various types, such as a capacitive touch type, a rotary type, and a switch type.

Due to the development of Light Emitting Diode (LED) lighting and LED lighting control technology, a user may make lighting control input in various manners at the present time. Among the lighting switches, a capacitive touch lighting switch senses a capacitive change depending on a change in the electric field of a touch sensing unit when a human hand touches the lighting switch, and utilizes sensed results for lighting control. In this case, a problem arises in that a human touch must be made and touch sensing cannot be performed out of a touch-sensitive range. Further, lighting control cannot be performed using hand motion out of the touch-sensitive range.

As related preceding technology, Korean Patent No. 1265650 (entitled "Lighting Apparatus and Method of Controlling the Lighting Apparatus Using Remote Controller") discloses technology that can simply control lighting devices connected through a network by using a remote control, and can not only control power using the interface of the remote control, but also control color temperature or dimming either precisely or in stages.

As another related preceding technology, there is Korean Patent Application Publication No. 2008-0079269 (entitled "LED Lighting System, LED Lighting Control System, and LED Lighting Unit Control Method"). This patent discloses technology that can solve a conventional problem in which, as part of LED light is leaked, the leaked light is mixed with converted light to change color emitted from a phosphor conversion LED, and in which, as light leakage changes according to time and temperature, a change in output is caused.

SUMMARY OF THE INVENTION

Accordingly, the present invention has been made keeping in mind the above problems occurring in the prior art, and an object of the present invention is to provide a lighting switch apparatus and a lighting switching method, which can perform lighting control by blocking or passing light from a lighting device using a user's hand motion while the user may make input to a lighting switch by means of a capacitive touch on the lighting switch.

In accordance with an aspect of the present invention to accomplish the above object, there is provided a lighting switch apparatus, including a capacitive touch sensing unit for recognizing a user's touch; a hand motion visible light receiving unit for receiving visible light from a lighting device depending on motion of the user's hand; and a control unit for generating a touch-based lighting control signal based on results of touch recognition by the capacitive touch sensing unit, controlling the hand motion visible light receiving unit so that the user's hand motion-based signal is output based on the results of touch recognition by the capacitive touch sensing unit, and generating a lighting control command by combining the lighting control signal with the user's hand motion-based signal.

The hand motion visible light receiving unit may include a light receiving unit for receiving the visible light; a photoelectric converter for converting the light received by the light receiving unit into electrical signals corresponding to the light; a programmable filter for performing frequency filtering in a corresponding one of a Visible Light Communication (VLC) mode and a hand motion signal mode on the electrical signals, output from the photoelectric converter, in response to a first control signal from the control unit; and a VLC signal processing and hand motion signal processing unit for performing corresponding signal processing of VLC signal processing and hand motion signal processing on a signal, having passed through the programmable filter, in response to a second control signal from the control unit.

The programmable filter may be configured to, when the first control signal is a signal indicative of the hand motion signal mode, pass a signal that can be created using hand motion, among electric signals output from the photoelectric converter, through the programmable filter.

The programmable filter may be configured to, when the first control signal is a signal indicative of the VLC mode, pass a signal in a VLC signal band, among the electrical signals output from the photoelectric converter, through the programmable filter.

The VLC signal processing and hand motion signal processing unit may be configured to, when the second control signal is a signal indicative of the hand motion signal mode, perform hand motion signal processing on the signal output from the programmable filter, and provide a resulting signal to the control unit.

The VLC signal processing and hand motion signal processing unit may be configured to, when the second control signal is a signal indicative of the VLC mode, perform VLC signal processing on the signal output from the programmable filter, and provide a resulting signal to the control unit.

The hand motion visible light receiving unit may further include a light guide tube, and the light receiving unit may receive the visible light input through the light guide tube.

The capacitive touch sensing unit and the hand motion visible light receiving unit may share a ground plane circuit so that levels of ground signals thereof are equal to each other.

The capacitive touch sensing unit may include an electric field change unit for causing a change in an electric field depending on the user's touch; a comparator for comparing a signal from the electric field change unit with a reference signal; a sampling and capturing unit for sampling and capturing a signal output from the comparator; and a touch signal processing unit for converting a signal output from the sampling and capturing unit into a signal readable by the control unit.

The electric field change unit may include a passive element, and the passive element may be adjusted to enable a touch sensing range to be controlled.

The lighting switch apparatus may further include a status display unit for displaying results of control by the control unit.

In accordance with another aspect of the present invention to accomplish the above object, there is provided a lighting switch, including a touch sensor pad configured such that a transparent panel is attached to a front surface thereof, the touch sensor providing a user's touch to a capacitive touch sensing unit; and a light guide tube configured to guide visible light that is input to the light guide tube after passing through the transparent panel, to the hand motion visible light receiving unit.

The touch sensor pad and the light guide tube may be each implemented to be plural.

In accordance with a further aspect of the present invention to accomplish the above object, there is provided a lighting switching method, including recognizing, by a capacitive touch sensing unit, a user's touch; generating, by a control unit, a touch-based lighting control signal based on results of touch recognition; receiving, by the control unit, a user's hand motion-based signal by controlling a hand motion visible light receiving unit based on results of the touch recognition; and generating, by the control unit, a lighting control command by combining the touch-based lighting control signal with the user's hand motion-based signal.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
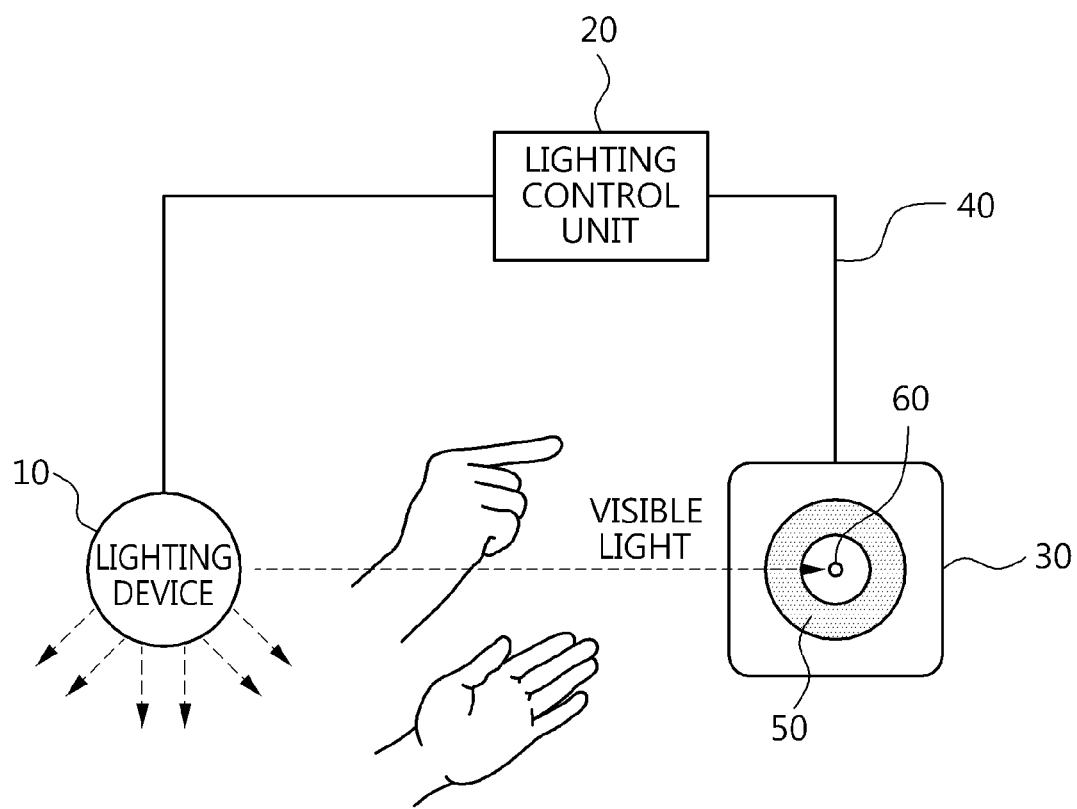
FIG. 1 is a schematic configuration diagram showing a lighting control system to which the present invention is applied.

The present invention may be variously changed and may have various embodiments, and specific embodiments will be described in detail below with reference to the attached drawings.

However, it should be understood that those embodiments are not intended to limit the present invention to specific disclosure forms and they include all changes, equivalents or modifications included in the spirit and scope of the present invention.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude a possibility that one or more other features, numbers, steps, operations, components, parts, or combinations thereof will be present or added.

Unless differently defined, all terms used here including technical or scientific terms have the same meanings as the terms generally understood by those skilled in the art to which the present invention pertains. The terms identical to those defined in generally used dictionaries should be interpreted as having meanings identical to contextual meanings of the related art, and are not interpreted as being ideal or excessively formal meanings unless they are definitely defined in the present specification.

Embodiments of the present invention will be described in detail with reference to the accompanying drawings. In the following description of the present invention, the same reference numerals are used to designate the same or similar elements throughout the drawings and repeated descriptions of the same components will be omitted.

FIG. 1 is a schematic configuration diagram showing a lighting control system to which the present invention is applied.

The lighting control system of FIG. 1 includes a lighting control unit 20 for controlling (e.g., turning-off, turning-on, brightness control, etc.) a lighting device 10, and a lighting switch 30 for receiving input from a user and transferring the user input to the lighting control unit 20 through a lighting control network 40.

The lighting device 10 may output not only light having a pulse wave output (e.g., Pulse Width Modulation (PWM) or modulated wave), but also output light having a non-modulated wave (having no pulse wave).

The lighting switch 30 includes a capacitive touch sensing unit 50 and a hand motion visible light receiving unit 60.

The capacitive touch sensing unit 50 senses a capacitive change depending on a change in the electric field of the capacitive touch sensing unit 50 when a user's hand touches the lighting switch 30. The results of sensing by the capacitive touch sensing unit 50 may be transferred to the lighting control unit 20 and may then be utilized for lighting control. For example, the capacitive touch sensing unit 50 may be formed in a circular ring shape.

The hand motion visible light receiving unit 60 may receive or not receive the visible light from the lighting device 10 depending on the user's hand motion. For example, the hand motion visible light receiving unit 60 may be installed at the center of the front panel of the lighting switch 30 while being spaced apart from the circular ring-shaped capacitive touch sensing unit 50.

Below, various cases corresponding to capacitive touch sensing and hand motion will be described.

Figure 2:
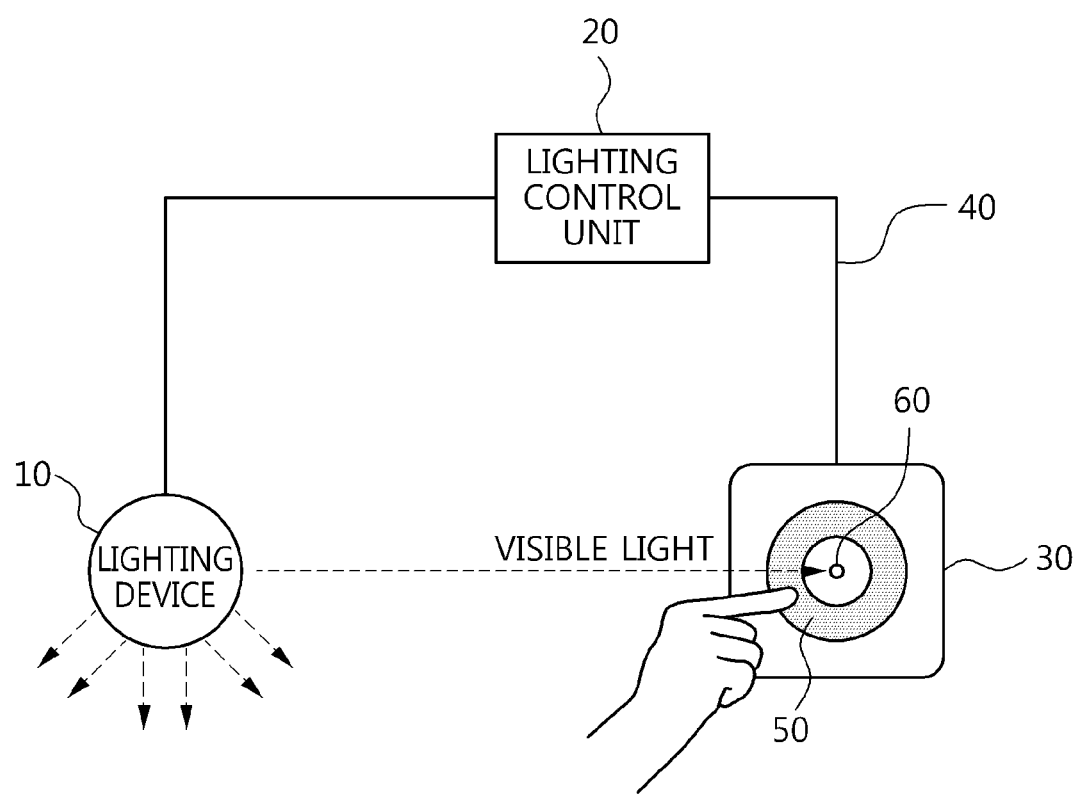
FIG. 2 is a diagram showing a case corresponding to the sensing of a capacitive touch and a reception ON function for visible light in FIG. 1.

First, a case corresponding to the sensing of a capacitive touch and a reception ON function for visible light will be described with reference to FIG. 2. In FIG. 2, when a user touches the capacitive touch sensing unit 50 of the lighting switch 30 so that visible light from the lighting device 10 is input to the hand motion visible light receiving unit 60, the capacitive touch sensing unit 50 senses the user's touch and the hand motion visible light receiving unit 60 receives the visible light.

Figure 3:
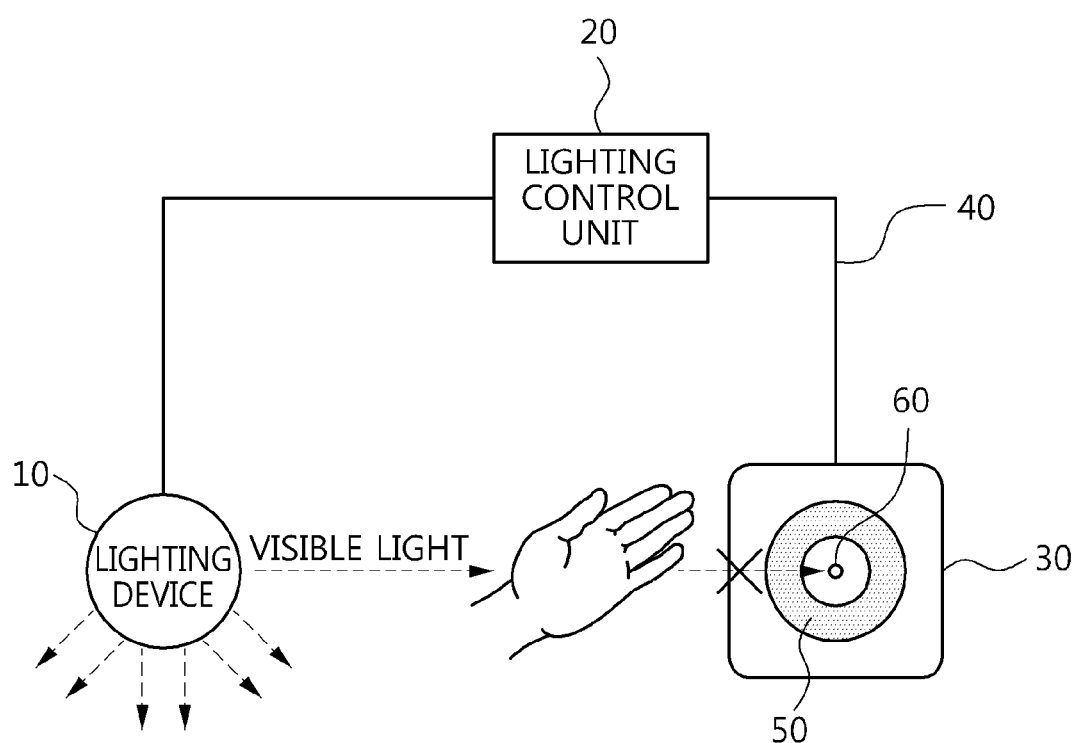
FIG. 3 is a diagram showing a case corresponding to a reception OFF function for visible light in FIG. 1.

As another case, a case corresponding to a reception OFF function for visible light will be described below with reference to FIG. 3. If the user hides the hand motion visible light receiving unit 60 behind his or her hand, as shown in FIG. 3, after lighting has been turned on by sensing the user's capacitive touch, the hand motion visible light receiving unit 60 turns off the reception function of visible light.

Figure 4:
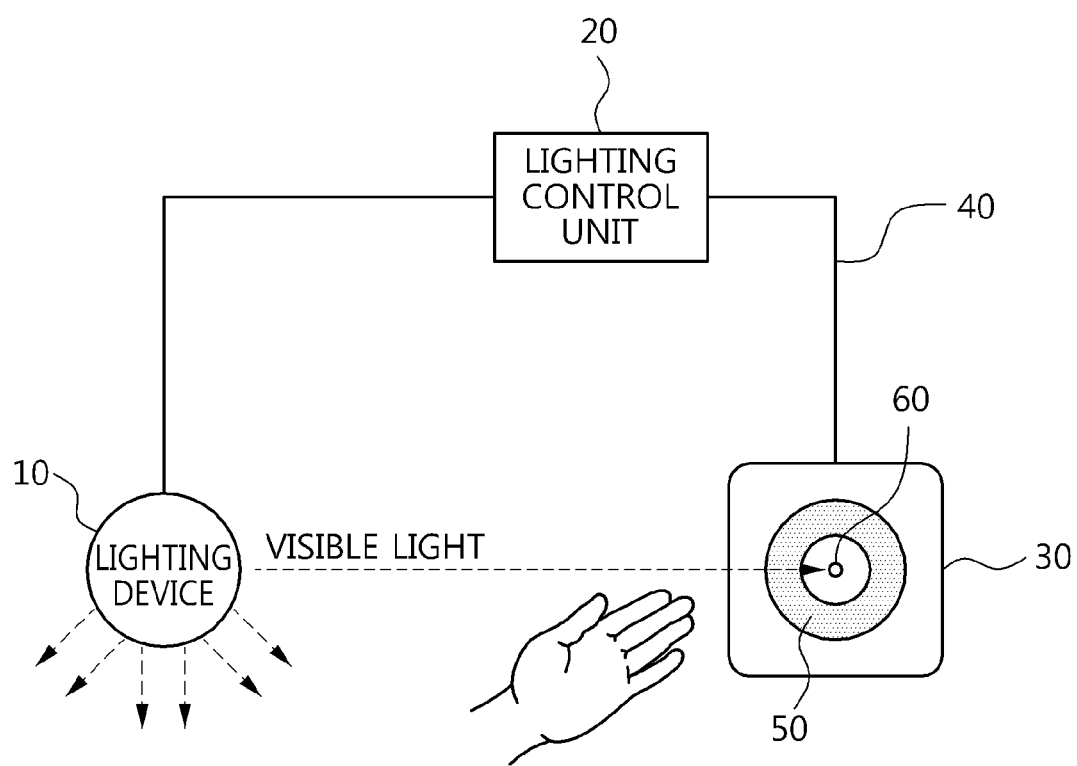
FIG. 4 is a diagram showing a case corresponding to the reception ON function for visible light in FIG. 1.

As a further case, a case corresponding to the reception ON function for visible light will be described below with reference to FIG. 4. If the hand motion visible light receiving unit 60 is not hidden so that the visible light of the lighting device 10 may be received by the hand motion visible light receiving unit 60, as shown in FIG. 4, after lighting has been turned on by sensing the user's capacitive touch, the hand motion visible light receiving unit 60 turns on the reception function of visible light.

Figure 5:
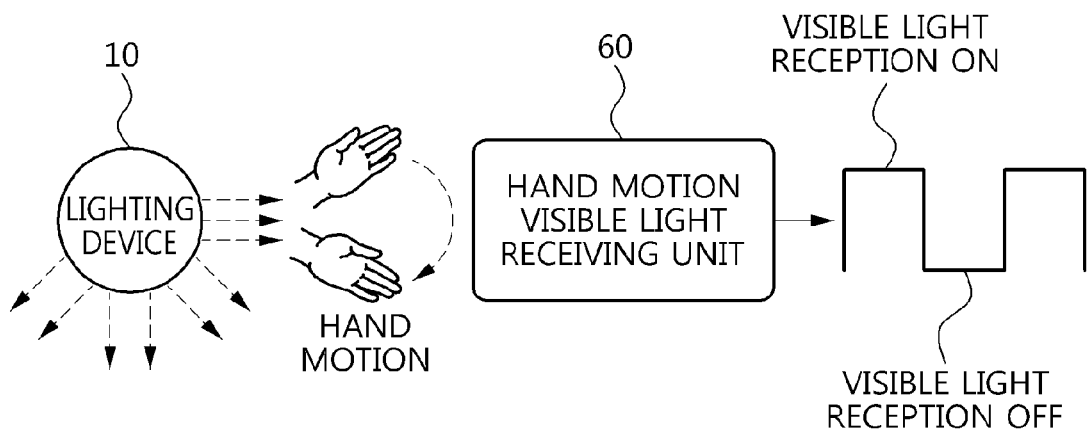
FIG. 5 is a diagram showing a case corresponding to reception ON/OFF functions for visible light depending on hand motion in FIG. 1.

As yet another case, a case corresponding to the reception ON/OFF functions for visible light depending on hand motion will be described below with reference to FIG. 5. As shown in FIG. 5. When the visible light from the lighting device 10 is moved to the hand motion visible light receiving unit 60, if the user repeats an operation of blocking or permitting the reception of visible light by the hand motion visible light receiving unit 60 while moving his or her hand, the hand motion visible light receiving unit 60 creates and outputs signals indicative of the reception ON and OFF functions for visible light depending on the motion of the user's hand.

Figure 6:
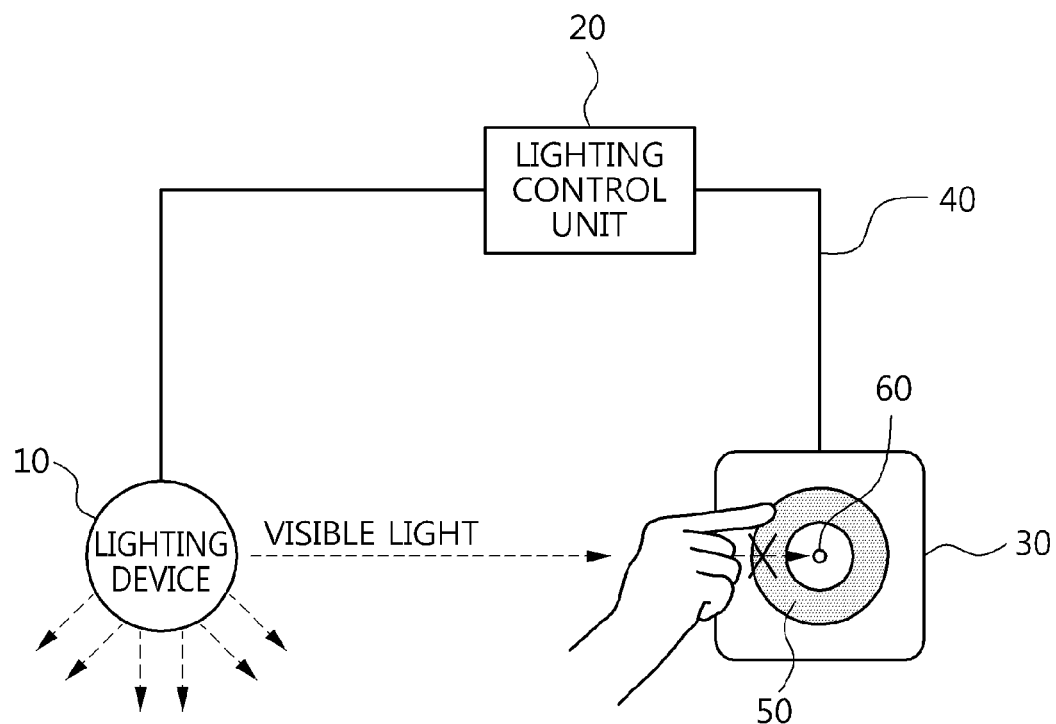
FIG. 6 is a diagram showing a case corresponding to the sensing of a capacitive touch and the reception OFF function for visible light in FIG. 1.

As still another case, a case corresponding to the sensing of a capacitive touch and the reception OFF function for visible light will be described below with reference to FIG. 6. As shown in FIG. 6, if the user touches the capacitive touch sensing unit 50 of the lighting switch 30 so that the visible light from the lighting device 10 is not input to the hand motion visible light receiving unit 60, only touch sensing by the capacitive touch sensing unit 50 is performed. In this case, the hand motion visible light receiving unit 60 cannot receive the visible light from the lighting device 10 and thus enters the reception OFF state of visible light.

Figure 7:
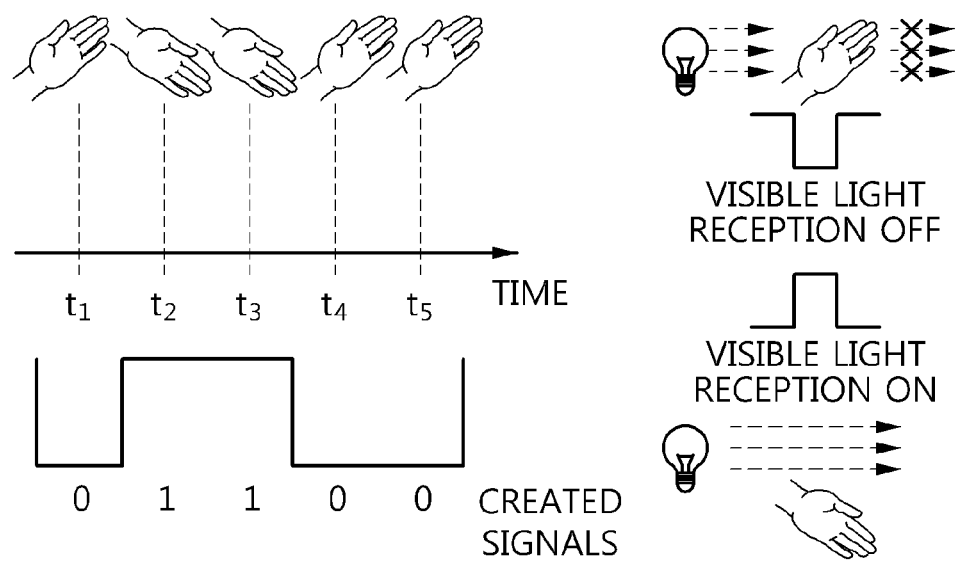
FIG. 7 is a diagram showing examples of the patterns of signals created depending on the hand motion in FIG. 1.

FIG. 7 is a diagram showing examples of the patterns of signals created depending on the hand motion in FIG. 1.

The hand motion visible light receiving unit 60 may create signals having various patterns by passing and blocking light by means of hand motion within a preset period of time.

That is, as shown in FIG. 7, when the user moves his or hand at preset time intervals t1, t2, t3, . . . , the hand motion visible light receiving unit 60 creates a signal (e.g., a square wave signal) corresponding to the reception or non-reception of visible light depending on whether visible light has been received.

In this way, the present invention may combine user inputs using sensing and receiving operations performed by the capacitive touch sensing unit 50 and the hand motion visible light receiving unit 60. That is, the following user input combinations may be implemented depending on the sensing/non-sensing of a capacitive touch, N capacitive touch sensing patterns, and reception ON/OFF functions for visible light.

1) N capacitive touch sensing patterns*visible light reception ON

2) N capacitive touch sensing patterns*visible light reception OFF

3) N capacitive touch sensing patterns*M visible light reception patterns

Case 1) is a user input combination in which the sensing of a capacitive touch may be implemented in N patterns while the reception of visible light is possible.

Case 2) is a user input combination in which the sensing of a capacitive touch may be implemented in N patterns while the reception of visible light is impossible.

Case 3) is a user input combination in which the reception of visible light has M patterns while the sensing of a capacitive touch is implemented in N patterns.

FIGS. 8A to 8G illustrate modifications of a lighting switch to which the present invention is applied.

Although a single capacitive touch sensing unit 50 and a single hand motion visible light receiving unit 60 are formed in a lighting switch 30 in FIG. 1, the shape and number of capacitive touch sensing units 50 and hand motion visible light receiving units 60 may be modified in various manners. The lighting switch to which the present invention is applied is not limited by the following lighting switches shown in FIGS. 8A to 8G.

Figure 8A:
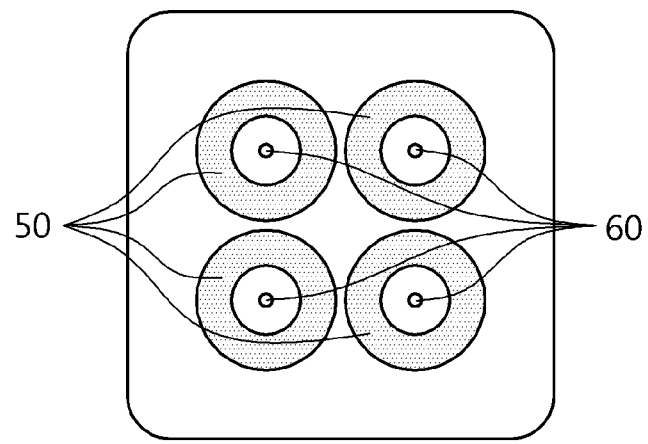
FIGS. 8A to 8G are diagrams showing modifications of a lighting switch to which the present invention is applied.

For example, as shown in FIG. 8A, four hand motion visible light receiving units 60 may be installed on the front surface of the lighting switch 30 while being spaced apart from each other. Four circular ring-shaped capacitive touch sensing units 50 may be respectively installed to enclose the corresponding hand motion visible light receiving units 60 while being spaced apart from the hand motion visible light receiving units 60.

Figure 8B:
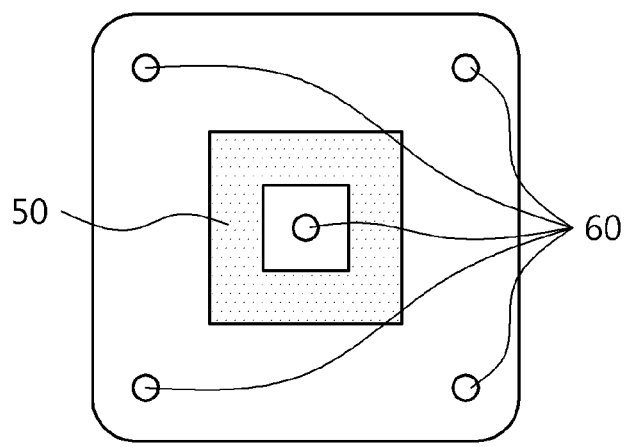

Further, as shown in FIG. 8B, a capacitive touch sensing unit 50 may be formed in the shape of a rectangular ring to enclose a hand motion visible light receiving unit 60 installed at the center of the lighting switch 30. In addition, hand motion visible light receiving units 60 may be additionally installed at the corners of the lighting switch 30, respectively.

Figure 8C:
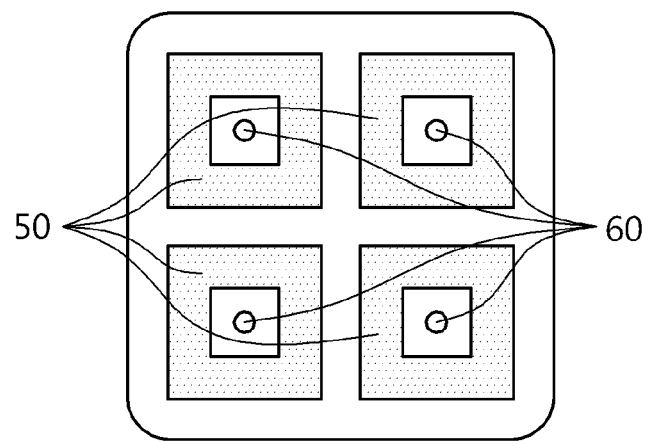

Furthermore, as shown in FIG. 8C, the hand motion visible light receiving unit 60 and the squared ring-shaped capacitive touch sensing unit 50 that are installed at the center of the front surface of the lighting switch 30 shown in FIG. 8*b* may be distributed to and arranged in four portions on the front surface of the lighting switch 30.

Figure 8D:
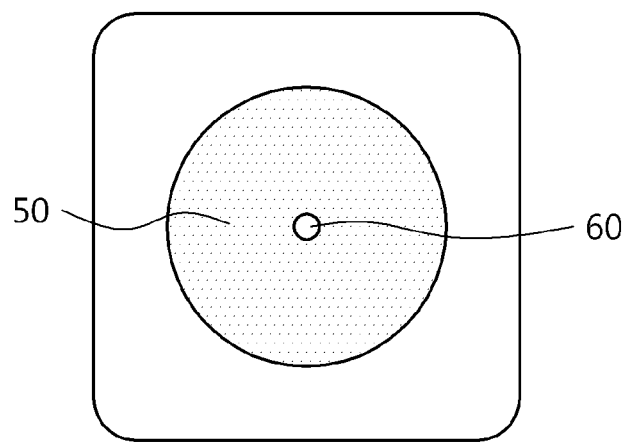

Furthermore, as shown in FIG. 8D, a circular capacitive touch sensing unit 50 having a predetermined diameter may be installed at the center of the front surface of the lighting switch 30, and a hand motion visible light receiving unit 60 may be installed at the center of the circular capacitive touch sensing unit 50.

Figure 8E:
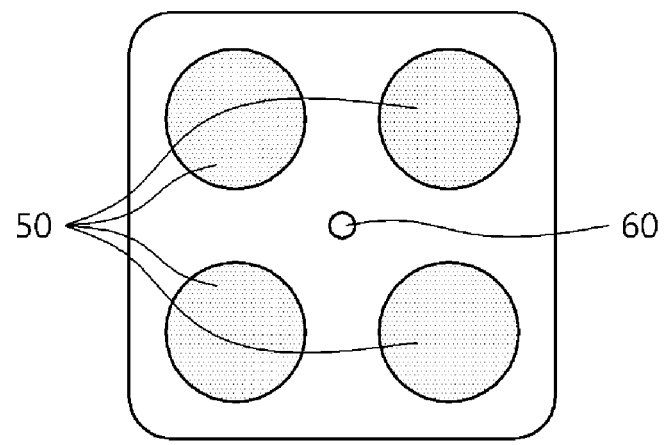

Furthermore, as shown in FIG. 8E, a hand motion visible light receiving unit 60 may be installed at the center of the front surface of the lighting switch 30, and circular capacitive touch sensing units 50 may be installed at the corners of the lighting switch 30 while being spaced apart from the hand motion visible light receiving unit 60 at the center.

Figure 8F:
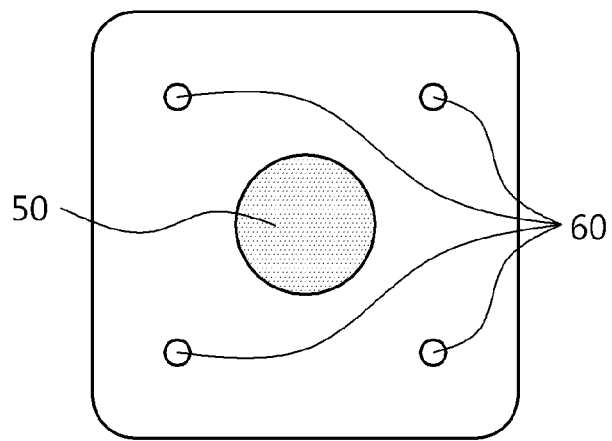

Furthermore, as shown in FIG. 8F, a circular capacitive touch sensing unit 50 may be installed at the center of the front surface of the lighting switch 30, and hand motion visible light receiving units 60 may be installed at the corners of the lighting switch 30 while being spaced apart from the center capacitive touch sensing unit 50.

Figure 8G:
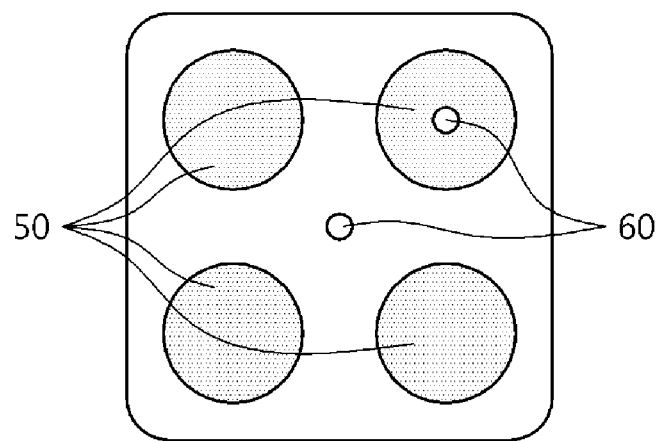

Furthermore, as shown in FIG. 8G, a hand motion visible light receiving unit 60 may be installed at the center of the front surface of the lighting switch 30. Circular capacitive touch sensing units 50, each having a predetermined diameter, may be installed at the corners of the lighting switch 30 while being spaced apart from the hand motion visible light receiving unit 60 at the center. In addition, a hand motion visible light receiving unit 60 may be additionally installed in any one of the capacitive touch sensing units 50 at the corners.

It is apparent that any modification other than the structures of FIGS. 8A to 8G is possible as long as the modification has a structure enabling both the sensing of a capacitive touch and the reception of visible light based on hand motion.

When the lighting switch is modified as shown in FIGS. 8A to 8G, more various types of user input combinations may be implemented compared to the above-described structure of FIG. 1.

Substantially, the lighting switch shown in FIGS. 1 to 8G corresponds to the front surface (that is, a portion viewed when the user looks at the lighting switch) of a lighting switch apparatus, which will be described later. Therefore, it is preferable to understand that the capacitive touch sensing unit 50 shown in FIGS. 1 to 8G is actually the touch sensor pad 53 of the capacitive touch sensing unit 50, which will be described later. Further, it is preferable to understand that the hand motion visible light receiving unit 60 shown in FIGS. 1 to 8G is actually the light guide tube 61 of the hand motion visible light receiving unit 60, which will be described later.

Figure 9:
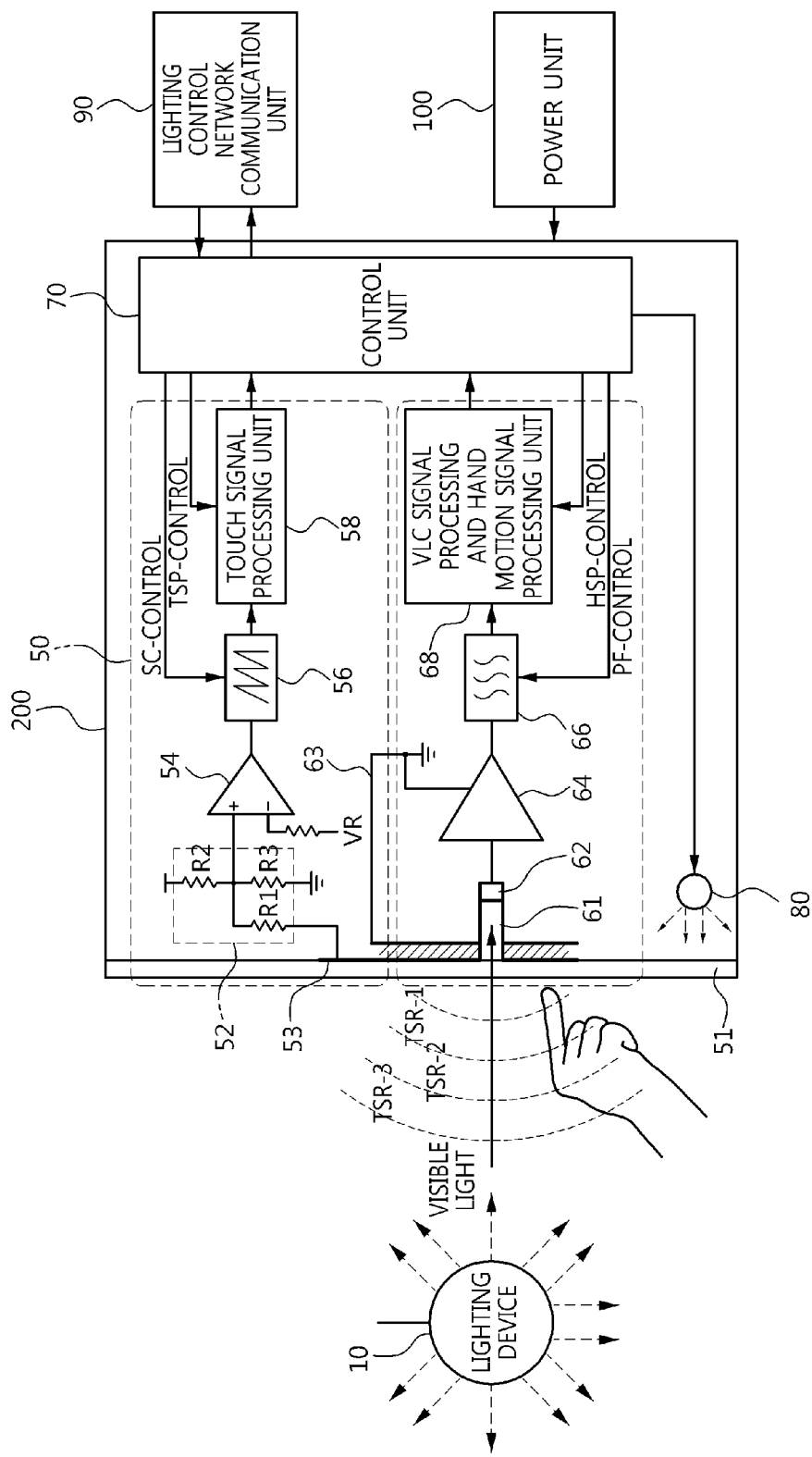
FIG. 9 is a configuration diagram showing a lighting switch apparatus according to an embodiment of the present invention.

FIG. 9 is a configuration diagram showing a lighting switch apparatus according to an embodiment of the present invention.

The lighting switch apparatus 200 according to the embodiment of the present invention includes a capacitive touch sensing unit 50, a hand motion visible light receiving unit 60, a control unit 70, and a status display unit 80.

The lighting switch apparatus 200 transmits a lighting control message to a lighting control network communication unit 90. The lighting control network communication unit 90 forwards the lighting control message to the lighting control unit 20.

Meanwhile, the lighting switch apparatus 200 may receive a status information request (status-require) from the lighting control network communication unit 90 and then output current status.

The lighting switch apparatus 200 is supplied with power from a power unit 100 and is then operated.

The lighting switch apparatus 200 is configured such that a glass or transparent panel 51 is mounted on the front surface thereof and a touch sensor pad 53 is installed on one surface of the panel 51 to come into close contact with the panel 51, so that a capacitive change depending on a human touch and the transmission of light are enabled, thus simultaneously performing the sensing of a capacitive touch and the reception of hand motion-based visible light.

The capacitive touch sensing unit 50 recognizes a human touch on the touch sensor pad 53. In this case, in the touch sensor pad 53, a light guide tube 61 for guiding the reception of visible light for an operation integrated with the hand motion visible light receiving unit 60 is configured together. The light guide tube 61 may be configured to be integrated with the touch sensor pad 53 or to be spaced apart from the touch sensor pad 53 according to various embodiments. Meanwhile, for the integrated operation, a ground plane circuit 63 is shared between the capacitive touch sensing unit 50 and the hand motion visible light receiving unit 60, thus causing the levels of ground signals thereof to be equal to each other.

The capacitive touch sensing unit 50 includes an electric field change unit 52, a comparator 54, a sampling and capturing unit 56, and a touch signal processing unit 18.

The electric field change unit 52 causes a change in an electric field between the touch sensor pad 53 and the ground plane circuit 63 as a human touch is applied to the touch sensor pad 53. For example, the electric field change unit 52 may include resistors R2 and R3 connected in series between a power circuit and a ground, and a resistor R1 connected at one end thereof to the touch sensor pad 53 and at the other end thereof to a node between the resistor R2 and the resistor R3. Here, the node between the resistor R2 and the resistor R3 is connected to one input terminal of the comparator 54. When passive elements, such as the resistors R1, R2, and R3 of the electric field change unit 52 connected to the touch sensor pad 53 are adjusted, a touch sensing range may be controlled. The capacitive touch sensing unit 50 may sense a touch only within a configured touch sensing range (e.g., one of TSR-1, TSR-2, and TSR-3). Therefore, the electric field change unit 52 may also be referred to as a touch sensing range configurer.

The comparator 54 receives the output (e.g., voltage component) of the electric field change unit 52 occurring when a human touch is applied to the touch sensor pad 53 through one input terminal thereof and receives a voltage reference VR through the other input terminal thereof. The comparator 54 compares the signals input through both the input terminals and outputs a signal corresponding to the results of comparison.

The sampling and capturing unit 56 samples and captures the output signal of the comparator 54. In this case, the sampling and capturing unit 56 performs sampling and capturing in response to a control signal (SC-control) from the control unit 70.

The touch signal processing unit 58 converts the signal output from the sampling and capturing unit 56 into a signal (e.g., a digital signal) readable by the control unit 70. In this case, the touch signal processing unit 58 performs a conversion operation in response to a control signal (TSP-control) from the control unit 70. The signal output from the touch signal processing unit 58 is transmitted as a lighting control signal to the lighting control network communication unit 90 via the control unit 70.

The hand motion visible light receiving unit 60 receives or blocks visible light depending on the user's hand motion for passing visible light, received from the lighting device 10, through the light guide tube 61 or blocking the visible light.

The hand motion visible light receiving unit 60 includes a light receiving element 62, a photoelectric converter 64, a programmable filter 66, and a visible light communication (VLC) signal processing and hand motion signal processing unit 68.

The light receiving element 62 is installed at the end of the light guide tube 61. The light receiving element 62 receives visible light through the light guide tube 61. For example, the light receiving element 62 may include one or more light receiving diodes.

The photoelectric converter 64 converts the light received by the light receiving element 62 into electrical signals corresponding to the light (optical-to-electrical or photoelectric conversion). In this case, the ground plane circuit 63 of the photoelectric converter 64 is shared with the touch sensor pad 53 of the capacitive touch sensing unit 50. The electrical signals output from the photoelectric converter 64 are input to the programmable filter 66.

The programmable filter 66 filters the electrical signals input from the photoelectric converter 64 in response to a control signal (PF-control) from the control unit 70.

The programmable filter 66 may support frequency filtering for operation modes, such as that shown in the following Table 1.

TABLE 1

| Operation mode | Filter pass frequency |
| --- | --- |
| VLC mode | 100 KHz~20 MHz |
| Hand motion signal mode | 0.1 Hz~4 Hz |

Referring to Table 1, in a Visible Light Communication (VLC) mode, the programmable filter 66 receives a VLC signal (e.g., a signal in a band ranging from 100 KHz to 20 MHz) including light from the lighting device or a communication signal transmitted from a visible light source (lighting), and performs filtering so that only the VLC signal passes through the programmable filter 66.

Referring to Table 1, in a hand motion signal mode, the programmable filter 66 passes only a signal (e.g., a signal in a band ranging from 0.1 Hz to 4 Hz band), which may be created using hand motion, therethrough.

In order to perform the filtering operation of such a programmable filter 66, any one of the VLC mode and the hand motion signal mode must be selected. The selection of a mode may be performed by sensing a designated touch from the touch sensor pad 53. For example, if the user successively touches the touch sensor pad 53 three or more times within a preset period of time after making a touch corresponding to initial lighting ON, the control unit 70 may determine that the VLC mode has been selected. Meanwhile, if the user continuously maintains a touch on the touch sensor pad 53 for a preset period of time after making a touch corresponding to initial lighting ON, the control unit 70 may determine that the hand motion signal mode has been selected.

Accordingly, the control unit 70 transmits a control signal (PF-control) indicating which mode has been selected to the programmable filter 66, and the programmable filter 66 performs filtering corresponding to the selected mode in response to the control signal (PF-control).

The VLC signal processing and hand motion signal processing unit 68 may receive the control signal (HSP-control) of the control unit 70, corresponding to the selected mode, and performs signal processing, corresponding to the selected mode, of VLC signal processing and hand motion signal processing, on the signal having passed through the programmable filter 66. For example, when the selected mode is the VLC mode, the VLC signal processing and hand motion signal processing unit 68 performs VLC signal processing on the signal output from the programmable filter 66 (that is, a VLC signal; a signal in a band ranging from 100 KHz to 20 MHz band). When the selected mode is the hand motion signal mode, the VLC signal processing and hand motion signal processing unit 68 performs hand motion signal processing on the signal output from the programmable filter 66 (that is, a signal that may be created using hand motion; signal in a band ranging from 0.1 Hz to 4 Hz).

The signal output from the VLC signal processing and hand motion signal processing unit 68 is transmitted to the control unit 70, and the control unit 70 transmits the signal as a lighting control signal to the lighting control network communication unit 90.

The status display unit 80 displays the results of control performed in response to the control signal from the control unit 70 so that the user may check the control results. For example, the status display unit 80 may include one or more LEDs.

The control unit 70 controls the operations of the capacitive touch sensing unit 50, the hand motion visible light receiving unit 60, and the status display unit 80. Preferably, the control unit 70 generates a touch-based lighting control signal based on first touch recognition results (that is, results of recognizing that a current touch is a touch for lighting control) received from the capacitive touch sensing unit 50. Further, the control unit 70 controls the hand motion visible light receiving unit 60 so that the user's hand motion-based signal is output based on second touch recognition results (the results of recognizing that a current mode is the hand motion signal mode of the VLC mode and the hand motion signal mode) received from the capacitive touch sensing unit 50. Furthermore, the control unit 70 may generate a lighting control command by combining the lighting control signal and the user's hand motion-based signal with each other.

In the above-described FIG. 9, the lighting switch apparatus may integrally designate an externally appearing part (the touch sensor pad 53 and the light guide tube 61) and a hidden part (the remaining part). Accordingly, the externally appearing part (the touch sensor pad 53 and the light guide tube 61) may be regarded as the lighting switch.

Figure 10:
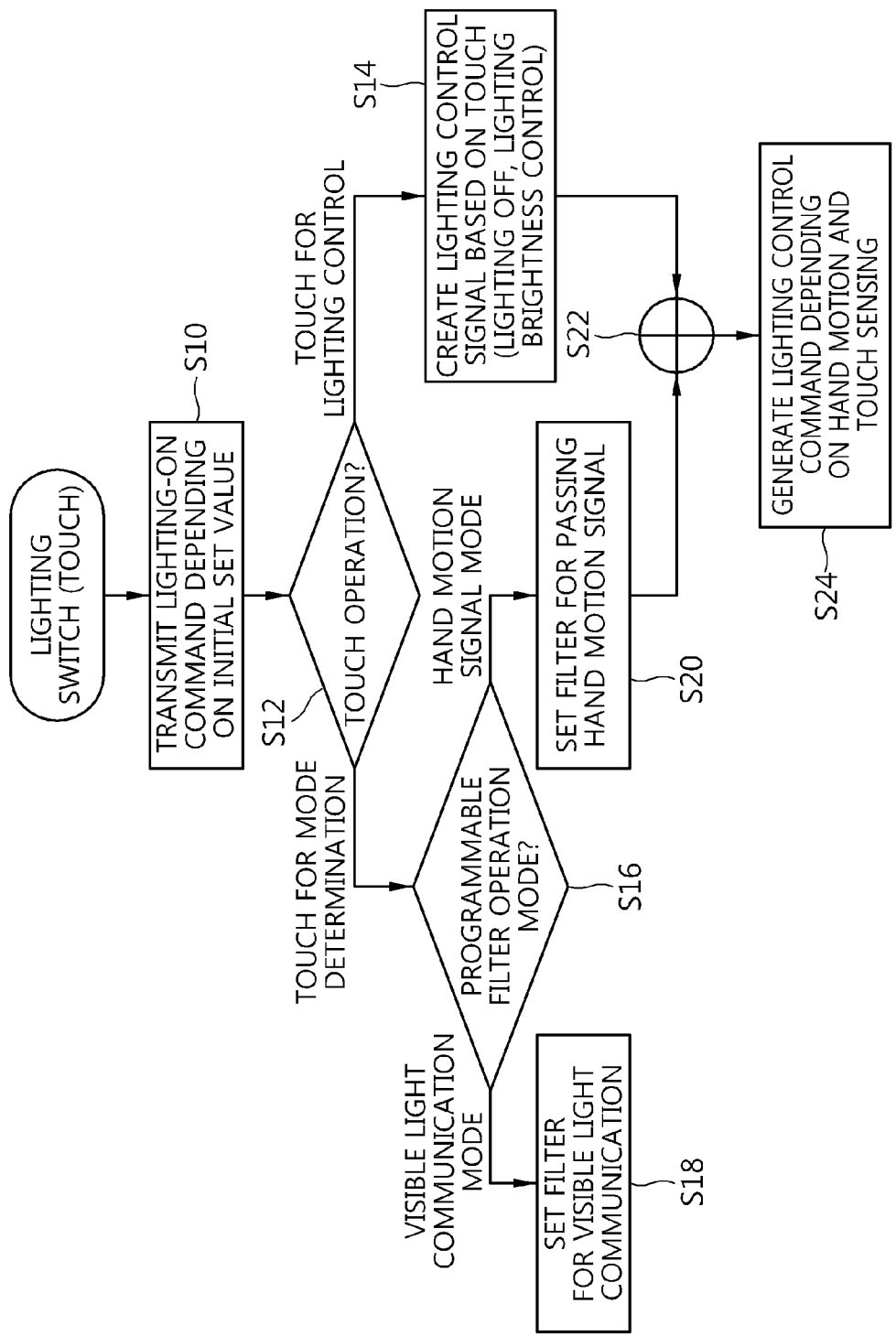
FIG. 10 is a flowchart showing a lighting switching method according to an embodiment of the present invention.

FIG. 10 is a flowchart showing a lighting switching method according to an embodiment of the present invention.

When a user touch (human touch) is applied to the lighting switch apparatus (or lighting switch) in an initial state in which the lighting device 10 is turned off, the capacitive touch sensing unit 50 senses the user touch and transmits a signal corresponding thereto to the control unit 70. Accordingly, the control unit 70 sends a command for turning on lighting according to an initial set value to the lighting control unit 20 through the lighting control network communication unit 90 at step S10. Then, the lighting control unit 20 turns on the lighting device 10.

When the lighting device is turned on, the control unit 70 allows a touch operation for lighting control or a touch operation for mode determination to be performed according to a subsequent touch operation at step S12.

For example, when the user touches the touch sensor pad 53 once within a preset period of time after making a touch corresponding to initial lighting ON, the control unit 70 recognizes such a touch operation as a touch operation for lighting control. Accordingly, the control unit 70 generates a lighting control signal (e.g., lighting OFF, lighting brightness control, etc.) corresponding to one touch operation of the user performed after initial lighting ON, and transmits the lighting control signal to the lighting control network communication unit 90. For example, when the user touches the touch sensor pad 53 only once for a predetermined time (e.g., less than 1 second) within a preset period of time after making a touch corresponding to initial lighting ON, the control unit 70 may transmit a lighting OFF signal to the lighting control network communication unit 90 depending on the results of touch sensing performed by the capacitive touch sensing unit 50. For example, when the user maintains a touch on the sensor pad 53 for one or more seconds within a preset period of time after making a touch corresponding to initial lighting ON, the control unit 70 may transmit a lighting brightness control signal to the lighting control network communication unit 90 depending on the results of touch sensing by the capacitive touch sensing unit 50. For example, the control unit 70 may send a signal causing lighting having higher brightness to be implemented as the time during which the user touches the touch sensor pad 53 becomes longer at step S14.

Meanwhile, when the user successively touches the touch sensor pad 53 three times within a preset period of time after making a touch corresponding to initial lighting ON, the control unit 70 recognizes such a touch operation as a touch operation for mode determination. Here, the preset period of time is periodically repeated. Further, it can be sufficiently known that one touch, two touches, or three touches have been made within a preset period of time by means of touch sensing performed by the capacitive touch sensing unit 50. The number of successive touches or touch gestures for mode determination may be implemented in various embodiments (e.g., two, three, four, or N successive touches, or a continuous touch gesture made from right to left in a touch state) within the scope of the present invention, and the present invention is not limited to three successive touches.

In this way, when the user's touch operation is the touch operation for mode determination, the control unit 70 determines which one of a VLC mode and a hand motion signal mode has been selected. This may be performed in such a way that, when the user successively touches the touch sensor pad 53 three times, makes successive touches for mode determination a number of times other than three times, or makes a predetermined touch gesture within a preset period of time after making a touch corresponding to initial lighting ON, the control unit 70 may determine that the VLC mode has been selected. Meanwhile, when the user continuously maintains a touch on the touch sensor pad 53 for a preset period of time after making a touch corresponding to initial lighting ON, the control unit 70 may determine that the hand motion signal mode has been selected.

As the VLC mode or the hand motion signal mode is selected, the control unit 70 determines the operation mode of the programmable filter 66 corresponding to the selected mode at step S16.

That is, when the VLC mode is selected, the control unit 70 transmits a control signal (PF-control) enabling the programmable filter 66 to act as the filter of the VLC mode to the programmable filter 66. Accordingly, the programmable filter 66 is set to a filter for VLC at step S18.

In contrast, when the hand motion signal mode is selected, the control unit 70 sends a control signal (PF-control) enabling the programmable filter 66 to act as the filter of the hand motion signal mode to the programmable filter 66. Accordingly, the programmable filter 66 is set to a filter for passing a hand motion signal therethrough at step S20.

When the hand motion signal mode is selected, the control unit 70 combines the results of hand motion and touch sensing with each other at step S22, and then generates various lighting control commands at step S24. In this case, various lighting control commands may be applied to the lighting control unit 20 through the lighting control network communication unit 90.

In accordance with the present invention having the above configuration, since a capacitive change depending on a human touch and the transmission of light are possible, the sensing of a capacitive touch and the reception of visible light based on hand motion may be simultaneously performed, so that the user can control lighting by blocking or passing light from a lighting device using hand motion while making an input to the lighting switch using a capacitive touch on the lighting switch.

As described above, optimal embodiments of the present invention have been disclosed in the drawings and the specification. Although specific terms have been used in the present specification, these are merely intended to describe the present invention and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. A lighting switch apparatus, comprising:
   a capacitive touch sensing unit for recognizing a user's touch;
   a hand motion visible light receiving unit for receiving visible light from a lighting device depending on motion of the user's hand; and
   a control unit for
      generating a touch-based lighting control signal based on results of touch recognition by the capacitive touch sensing unit,
      controlling the hand motion visible light receiving unit so that the user's hand motion-based signal is output based on the results of touch recognition by the capacitive touch sensing unit, and
      generating a lighting control command by combining the lighting control signal with the user's hand motion-based signal,
   wherein the hand motion visible light receiving unit comprises
      a light receiving unit for receiving the visible light,
      a photoelectric converter for converting the light received by the light receiving unit into electrical signals corresponding to the light,
      a programmable filter for performing frequency filtering in a corresponding one of a Visible Light Communication (VLC) mode and a hand motion signal mode on the electrical signals, output from the photoelectric converter, in response to a first control signal from the control unit, and
      a VLC signal processing and hand motion signal processing unit for performing corresponding signal processing of VLC signal processing and hand motion signal processing on a signal, having passed through the programmable filter, in response to a second control signal from the control unit.

2. The lighting switch apparatus of claim 1, wherein the programmable filter is configured to, when the first control signal is a signal indicative of the hand motion signal mode, pass a signal that can be created using hand motion, among electric signals output from the photoelectric converter, through the programmable filter.

3. The lighting switch apparatus of claim 1, wherein the programmable filter is configured to, when the first control signal is a signal indicative of the VLC mode, pass a signal in a VLC signal band, among the electrical signals output from the photoelectric converter, through the programmable filter.

4. The lighting switch apparatus of claim 1, wherein the VLC signal processing and hand motion signal processing unit is configured to, when the second control signal is a signal indicative of the hand motion signal mode, perform hand motion signal processing on the signal output from the programmable filter, and provide a resulting signal to the control unit.

5. The lighting switch apparatus of claim 1, wherein the VLC signal processing and hand motion signal processing unit is configured to, when the second control signal is a signal indicative of the VLC mode, perform VLC signal processing on the signal output from the programmable filter, and provide a resulting signal to the control unit.

6. The lighting switch apparatus of claim 1, wherein:
   the hand motion visible light receiving unit further comprises a light guide tube, and
   the light receiving unit receives the visible light input through the light guide tube.

7. The light switching apparatus of claim 1, wherein the capacitive touch sensing unit and the hand motion visible light receiving unit share a ground plane circuit so that levels of ground signals thereof are equal to each other.

8. The light switching apparatus of claim 1, wherein the capacitive touch sensing unit comprises:
   an electric field change unit for causing a change in an electric field depending on the user's touch;
   a comparator for comparing a signal from the electric field change unit with a reference signal;
   a sampling and capturing unit for sampling and capturing a signal output from the comparator; and
   a touch signal processing unit for converting a signal output from the sampling and capturing unit into a signal readable by the control unit.

9. The lighting switch apparatus of claim 8, wherein:
   the electric field change unit comprises a passive element, and
   the passive element is adjusted to enable a touch sensing range to be controlled.

10. The lighting switch apparatus of claim 1, further comprising a status display unit for displaying results of control by the control unit.

11. A lighting switch apparatus, comprising:
   a capacitive touch sensing unit for recognizing a user's touch;
   a hand motion visible light receiving unit for receiving visible light from a lighting device depending on motion of the user's hand; and
   a control unit for
      generating a touch-based lighting control signal based on results of touch recognition by the capacitive touch sensing unit,
      controlling the hand motion visible light receiving unit so that the user's hand motion-based signal is output based on the results of touch recognition by the capacitive touch sensing unit, and
      generating a lighting control command by combining the lighting control signal with the user's hand motion-based signal,
   wherein the capacitive touch sensing unit comprises
      an electric field change unit for causing a change in an electric field depending on the user's touch,
      a comparator for comparing a signal from the electric field change unit with a reference signal,
      a sampling and capturing unit for sampling and capturing a signal output from the comparator, and
      a touch signal processing unit for converting a signal output from the sampling and capturing unit into a signal readable by the control unit.

12. The lighting switch apparatus of claim 11, wherein:
the electric field change unit comprises a passive element, and
the passive element is adjusted to enable a touch sensing range to be controlled.

\* \* \* \* \*